United States Patent
Liu et al.

(10) Patent No.: US 11,360,799 B2
(45) Date of Patent: Jun. 14, 2022

(54) VIRTUAL MACHINE LIVE MIGRATION WITH SEAMLESS NETWORK CONNECTIVITY

(71) Applicant: International Business Machines Corporation, Armonk, NY (US)

(72) Inventors: Joseph Liu, Nashua, NH (US); Marc Cochran, Shrewsbury, MA (US); Alexander T. Iannicelli, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 16/861,165

(22) Filed: Apr. 28, 2020

(65) Prior Publication Data

US 2021/0334124 A1 Oct. 28, 2021

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,165,107 B2 | 1/2007 | Pouyoul et al. | |
| 9,438,506 B2 | 9/2016 | Ryland | |
| 9,977,688 B2 | 5/2018 | Nipane et al. | |
| 2009/0292858 A1 | 11/2009 | Lambeth et al. | |
| 2016/0196158 A1 | 7/2016 | Nipane et al. | |
| 2018/0124139 A1 | 5/2018 | Jiang et al. | |
| 2018/0183580 A1* | 6/2018 | Scarlata | G06F 9/4856 |
| 2020/0159556 A1* | 5/2020 | Chandrappa | G06F 9/54 |

FOREIGN PATENT DOCUMENTS

CN 102446119 A 5/2012

OTHER PUBLICATIONS

Lo et al., "Design and Analysis of Schedules for Virtual Network Migration," 2013 IFIP Networking Conference, Brooklyn, NY, 2013, pp. 1-9.

* cited by examiner

*Primary Examiner* — Lewis A Bullock, Jr.
*Assistant Examiner* — Melissa A Headly
(74) *Attorney, Agent, or Firm* — Yee & Associates, P.C.

(57) ABSTRACT

A virtual machine live migration is performed. A port mirroring rule for a source virtual machine in source computer is created by a computer system such that ingress traffic received at the source computer for the source virtual machine is delivered to both the source virtual machine and a target virtual machine on a target computer. The port mirroring rule is established prior to the virtual machine live migration from the source virtual machine to the target virtual machine. The source virtual machine on the source computer is migrated by the computer system to the target virtual machine on the target computer in which the port mirroring rule directs the ingress traffic to both the source virtual machine and the target virtual machine while the source virtual machine is migrated from the source computer to the target virtual machine on the target computer during the virtual machine live migration.

18 Claims, 10 Drawing Sheets

VIRTUAL MACHINE LIVE MIGRATION WITH SEAMLESS NETWORK CONNECTIVITY

BACKGROUND

1. Field

The disclosure relates generally to an improved computer system and, more specifically, to a method, apparatus, computer system, and computer program product for live migration of virtual machines.

2. Description of the Related Art

Virtual machines can run on physical computers to provide services over a network such as the Internet. With workloads changing dynamically in services, a virtual machine can be moved from one server computer to another server computer to accommodate workloads changes. A virtual machine can also be moved to run the virtual machine on a server computer that has processing resources that enable optimized performance of the virtual machine. This movement of a virtual machine is also referred to as a migration or a virtual machine live migration.

A virtual machine live migration can be performed in which the virtual machine being migrated still operates during the migration from the current server computer to another server computer. Live migrations are desirable to reduce downtime and unavailability of virtual machines to process requests. This type of migration involves moving a running virtual machine from one server computer to another server computer without disconnecting a client that may be connected to the running virtual machine. A virtual machine live migration can begin by creating a target virtual machine on a target computer and put to the target virtual machine in a pause state. The target virtual machine has the same domain parameters as a source virtual machine on a source server computer.

While the source virtual machine continues to run, memory pages are transferred from the source virtual machine to the target virtual machine. Any additional dirty pages in memory due to the execution of the source virtual machine are continuously transferred to the target virtual machine until only a few dirty pages remain.

The source virtual machine is paused and synchronization of virtual machine virtual disks is performed. The state of the source virtual machine virtual devices and any remaining information such as remaining dirty pages are sent to the target virtual machine. The target virtual machine is then resumed from the pause state to a run state. The virtual machine live migration process is complete with the source virtual machine being removed from the source computer.

SUMMARY

According to one embodiment of the present invention, a method performs a virtual machine live migration. A port mirroring rule for a source virtual machine in source computer is created by a computer system such that ingress traffic received at the source computer for the source virtual machine is delivered to both the source virtual machine and a target virtual machine on a target computer. The port mirroring rule is established prior to the virtual machine live migration from the source virtual machine to the target virtual machine. The source virtual machine on the source computer is migrated by the computer system to the target virtual machine on the target computer in which the port mirroring rule directs the ingress traffic to both the source virtual machine and the target virtual machine while the source virtual machine is migrated from the source computer to the target virtual machine on the target computer during the virtual machine live migration.

According to another embodiment of the present invention, a virtual machine migration system comprises a computer system that creates a port mirroring rule for a source virtual machine in a source computer such that ingress traffic received at the source computer for the source virtual machine is delivered to both the source virtual machine and a target virtual machine on a target computer. The port mirroring rule is established prior to a virtual machine live migration from the source virtual machine to the target virtual machine. The computer system migrates the source virtual machine on the source computer to the target virtual machine on the target computer in which the port mirroring rule directs the ingress traffic to both the source virtual machine and the target virtual machine while the source virtual machine is migrated from the source computer to the target virtual machine on the target computer during the virtual machine live migration.

According to yet another embodiment of the present invention, a computer program product can perform a virtual machine live migration. The computer program product comprises a computer-readable storage media with first program code and second program code stored on the computer-readable storage media. The first program code is executable by a computer system to cause the computer system to create a port mirroring rule for a source virtual machine in source computer such that ingress traffic received at the source computer for the source virtual machine is delivered to both the source virtual machine and a target virtual machine on a target computer, wherein the port mirroring rule is established prior to the virtual machine live migration. The second program code is executable by the computer system to cause the computer system to migrate the source virtual machine on the source computer to the target virtual machine on the target computer in which the port mirroring rule directs the ingress traffic to both the source virtual machine and the target virtual machine while the source virtual machine is migrated from the source computer to the target virtual machine on the target computer during the virtual machine live migration.

DETAILED DESCRIPTION

Figure 1:
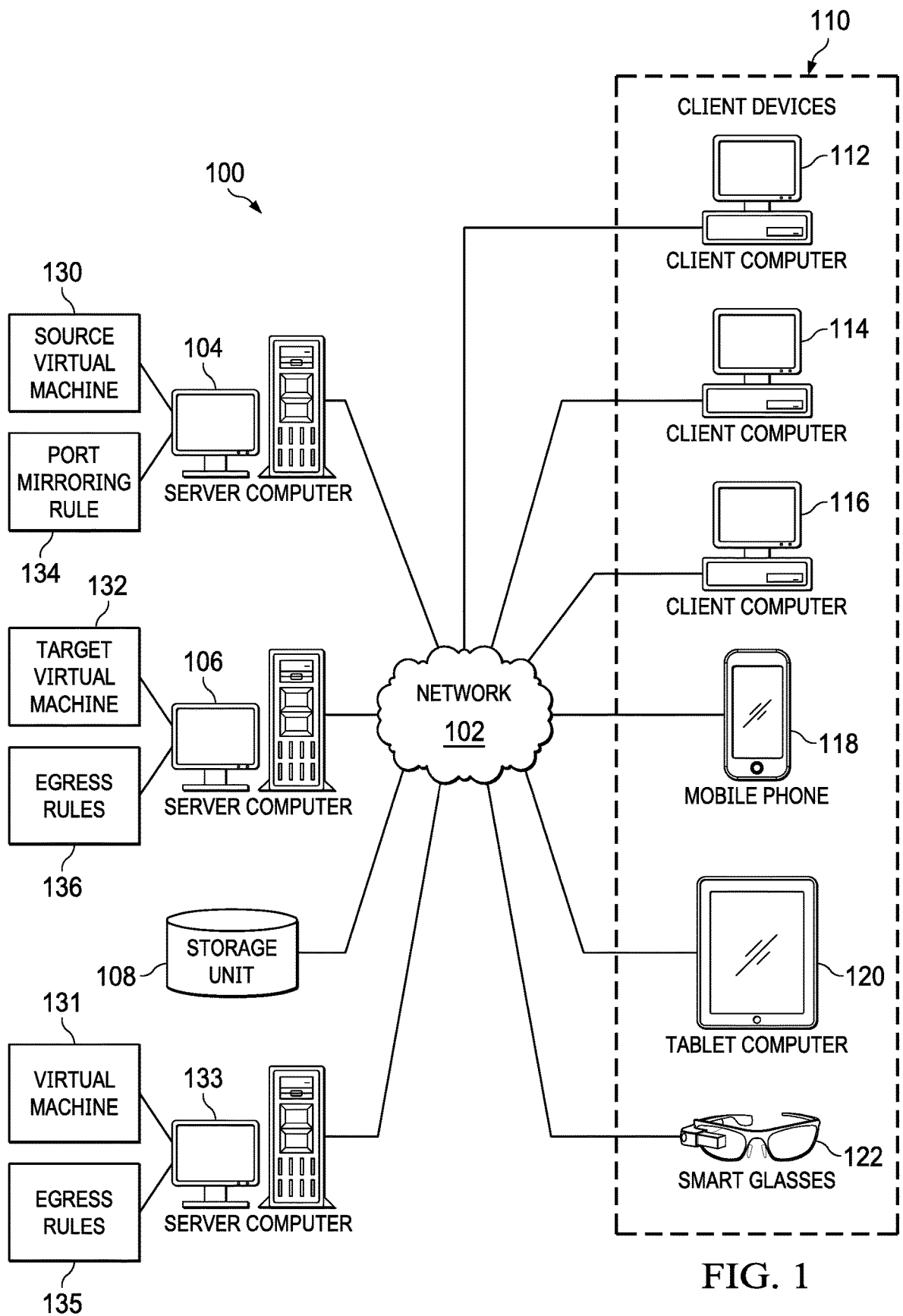
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative environments recognize and take into account that when a virtual machine is migrated from one computer to another computer, it is desirable to maintain connectivity to other virtual machines and clients that may be connected to the virtual machine. The illustrative embodiments recognize and take into account that maintaining this connectivity as part of a virtual machine live migration can be challenging with a virtual overlay network in which a virtual network is built on top of the physical network.

The illustrative embodiments recognize and take into account that a cloud virtual overlay network can be implemented as a virtual network with a virtual extensible local area network (VXLAN). The illustrative embodiments recognize and take into account that with this type of network, the connectivity of a guest virtual machine network is mapped to VXLAN flows as tunnel rules at each of the physical computers for tunneling through the underlay physical IP network. In such a virtual network, the illustrative embodiments recognize and take into account that maintaining the network connectivity of the migrated virtual machines to and from all the other virtual machines during the migration process can be challenging.

The illustrative embodiments recognize and take into account that challenges in maintaining seamless connectivity can occur during the "switchover" of the virtual overlay network connectivity tunneling rules of all other virtual machines from a source virtual machine to a target virtual machine. The illustrative embodiments provide a method, apparatus, system, and computer program product for migrating virtual machines. In one illustrative example, a virtual machine live migration is performed to migrate from a source virtual machine to a target virtual machine. A port mirroring rule is created for a source virtual machine in a source computer such that ingress traffic received at the source computer for the source virtual machine is delivered to both the source virtual machine and the target virtual machine on a target computer, wherein the port mirroring rule is established prior to the virtual machine live migration. The source virtual machine on the source computer is migrated to the target virtual machine on the target computer in which the port mirroring rule directs the ingress traffic to both the source virtual machine and the target virtual machine while the source virtual machine is migrated from the source computer to the target virtual machine on the target computer during the virtual machine live migration.

As a result, network connection and application state can be maintained during the migration process such that continuous uptime is provided to users, applications, and other virtual machines that are connected to a virtual machine that is being migrated. This type of migration can be useful with overlay networks when many virtual machines are present.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, source virtual machine 130 runs on server computer 104 in network data processing system 100. In this example, server computer 104 is a source computer and can be referred to as a source host or a source server. Source virtual machine 130 is running on server computer 104 and is to be migrated to a target computer such as server computer 106. The migration involves transferring dynamic information used to operate source virtual machine 130 to target virtual machine 132 in server computer 106.

As depicted, server computer 104 and server computer 106 can be hardware components for a virtual overlay network. Source virtual machine 130 can be a known or virtual compartment within the virtual overlay network.

After the migration, clients or any other software or hardware having a connection to source virtual machine 130 continues communication with target virtual machine 132 on server computer 106 without knowing that the communication moved from source virtual machine 130 on server computer 104 to target virtual machine 132 on server computer 106.

In this illustrative example, the virtual machine live migration can be steps that are performed during different times. These times include at least one of prior to the migration, during the migration, and after the migration.

For example, prior to the migration, target virtual machine 132 is set up on server computer 106 and placed in a pause state. Further, port mirroring rule 134 is set up in server computer 104. Port mirroring rule 134 copies or mirrors traffic received at a specific port that the source virtual machine is connected to. This port can be in a switch, a router, a computer network interface card, a virtual network, or some other component.

In this illustrative example, port mirroring rule 134 is set up as an ingress tunnel rule. With port mirroring rule 134, ingress traffic received from other virtual machines sent to server computer 104 for source virtual machine 130 is made available to both source virtual machine 130 on server computer 104 and target virtual machine 132 on server computer 106.

In other words, a data packet received containing data in the ingress traffic is directed to both source virtual machine 130 and target virtual machine 132. The data packet can be copied or duplicated such that both source virtual machine 130 and target virtual machine 132 received the data packet. As a result, data in the ingress traffic received at server computer 104 for source virtual machine 130 is sent to both source virtual machine 130 and target virtual machine 132 when port mirroring rule 134 is put into place. As depicted, port mirroring rule 134 is used during the entire process of the virtual machine live migration.

Additionally, prior to the beginning of the virtual machine live migration, egress rules 136 for target virtual machine 132 are set up in server computer 106 to direct egress traffic from target virtual machine 132 to other virtual machines, such as virtual machine 131, or on other server computers, such as server computer 133. As depicted, egress rules 135 direct egress traffic from virtual machine 131 to source virtual machine 130 on server computer 104. These other virtual machines have a connection to source virtual machine 130 that exists prior to starting the virtual machine live migration from source virtual machine 130 to target virtual machine 132. These egress rules can also be set up during the virtual machine live migration when new virtual machines connected to source virtual machine 130 are created.

During the migration, no changes are needed to source virtual machine 130 or target virtual machine 132 to maintain network connectivity. With the use of port mirroring rule 134, ingress traffic received at server computer 104 for source virtual machine 130 is directed to both source virtual machine 130 and target virtual machine 132. With the prior setup of egress rules 136 for target virtual machine 132 at target computer 106 to all other virtual machines on other computers, whenever target virtual machine 132 resumes execution, the egress traffic from target virtual machine 132 to the other virtual machines is directed to other server computers hosting the other virtual machines, such as virtual machine 131 on server computer 133. The connectivity is maintained during migration regardless of whether source virtual machine 130 or target virtual machine 132 are in active service. In this example, network connectivity to all other virtual machines that have network connection with source virtual machine 130 is maintained.

After virtual machine live migration has completed, control is passed to target virtual machine 132. In other words, target virtual machine 132 is now in active service. At this time, the ingress traffic flows to target virtual machine 132 without interruption using port mirroring rule 134 in server computer 104. Further, egress rules 136 in server computer 106 enable target virtual machine 132 to send the egress traffic to the other virtual machines in response to the ingress traffic received by target virtual machine 132. Now that target virtual machine 132 is running, A switchover can be made to the computers on which other virtual machines are located to now direct traffic from these virtual machines directly to target virtual machine 132 on server computer 106. Once these rules are set up on the other computers, port mirroring rule 134 can be removed. Further, other rules on server computer 104 for source virtual machine 130 can also be removed along with source virtual machine 130.

As depicted, the migration is a virtual machine live migration in which seamless network connectivity occurs with respect to virtual machines. The network connectivity can also be for other software in addition to or in place of the virtual machines. This other software can include at least one of applications, servers, databases, or other software. In other words, the virtual machine live migration occurs in which the network connectivity to both to the source virtual machine and the target virtual machine is maintained at the source computer during the virtual machine live migration from all other virtual machines or clients using the port mirroring rule.

In this manner, the migration of source virtual machine to target virtual machine is performed with no disruption in service or less disruption as compared to current techniques for virtual machine live migration. The maintaining of network connectivity can be made more easily with virtual machines in overlay networks in the illustrative example as compared to current techniques.

Figure 2:
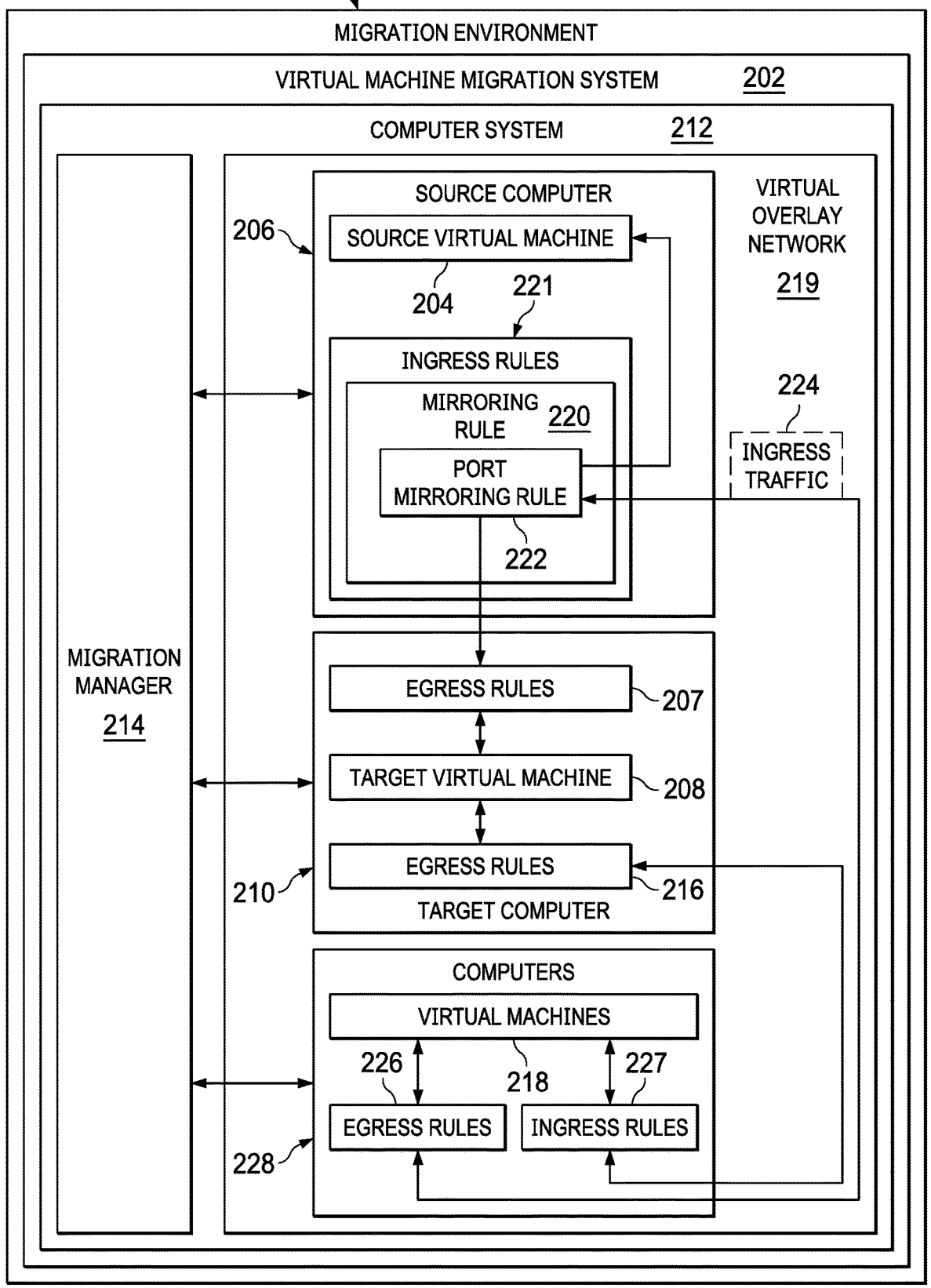
FIG. 2 is a block diagram of a migration environment in accordance with an illustrative embodiment.

With reference now to FIG. 2, a block diagram of a migration environment is depicted in accordance with an illustrative embodiment. In this illustrative example, migration environment 200 includes components that can be implemented in hardware such as the hardware shown in network data processing system 100 in FIG. 1.

In migration environment 200, a virtual machine live migration can be performed using virtual machine migration system 202. In this illustrative example, the virtual machine live migration can be performed for source virtual machine 204 running on source computer 206. The virtual machine live migration can migrate source virtual machine 204 to target virtual machine 208 on target computer 210. In the illustrative example, this migration from source virtual machine 204 to target virtual machine 208 can be performed with reduced or no impact to network connectivity to other virtual machines 218 on other server computers 228 that may be connected to source virtual machine 204.

In this illustrative example, virtual machine migration system 202 includes a number of different components. As depicted, virtual machine migration system 202 comprises computer system 212 and migration manager 214 in computer system 212.

Migration manager 214 can be implemented in software, hardware, firmware or a combination thereof. When software is used, the operations performed by migration manager 214 can be implemented in program code configured to run on hardware, such as a processor unit. When firmware is used, the operations performed by migration manager 214 can be implemented in program code and data and stored in persistent memory to run on a processor unit. When hardware is employed, the hardware may include circuits that operate to perform the operations in migration manager 214.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, migration manager 214 in computer system 212 creates target virtual machine 208 on target computer 210. In this example, target virtual machine 208 is placed in a pause state.

In this example, a set of virtual machines 218 runs on computers 228. As depicted, source computer 206, target computer 210, and the set of computers 228 can be hardware components in virtual overlay network 219. Source virtual machine 204, target virtual machine 208, and the set of virtual machines 218 can be part of the virtual portion of virtual overlay network 219. These virtual machines can be, for example, components such as virtual computers or other components that are connected by virtual links that can traverse multiple physical links between source computer 206, target computer 210, and the set of computers 228.

Migration manager 214 can create a set of egress rules 216 for the set of virtual machines 218 that may be in communication with source virtual machine 204. The set of egress rules 216 is created such that any egress traffic from target virtual machine 208 reaches the set of virtual machines 218. In this depicted example, the egress traffic from target virtual machine 208 is sent to computers 228 and processed by ingress rules 227 in computers 228 such that the egress traffic from target virtual machine 210 is sent to virtual machines 218.

As depicted, migration manager 214 creates mirroring rule 220 in ingress rules 221 for source virtual machine 204 in source computer 206 such that ingress traffic 224 received at source computer 206 for source virtual machine 204 is delivered to both source virtual machine 204 and target virtual machine 208 on target computer 210. Ingress traffic 224 can be delivered to both source virtual machine 204 and target virtual machine 208 by ingress traffic 224 to source virtual machine 204 and by replicating and sending a copy of ingress traffic 224 to target virtual machine 208. In other words, data packets in ingress traffic 224 can be replicated and sent to target virtual machine 208.

In this example, mirroring rule 220 is port mirroring rule 222 in which a copy of network packets received in one port is sent to another port. The port can be in a switch, a virtual local area network, a router, a computer, a network interface card, or some other component. As depicted, port mirroring rule 222 can be at least one of a layer-2 rule that redirects mirrored traffic to a media access controller address for a virtual network interface controller for target virtual machine 208 or a layer-3 rule that redirects the mirrored traffic to an Internet Protocol (IP) address for the virtual network interface controller for target virtual machine 208. Port mirroring rule 222 can be implemented by a processing unit in a network adapter. This network adapter can be, for example, a smart network interface card, which may take a physical or virtual form.

In this illustrative example, the set of egress rules 216 and port mirroring rule 222 can be rules that define an Internet Protocol (IP) tunnel between two networks. This tunneling allows for movement of data in a manner that allows for private network communications sent across the public network, such as the Internet, using encapsulation.

As depicted, port mirroring rule 222 is established by migration manager 214 prior to a virtual machine live migration from source virtual machine 204 to target virtual machine 208. Migration manager 214 migrates source virtual machine 204 on source computer 206 to target virtual machine 208 on target computer 210. During this migration, ingress traffic 224 received at source computer 206 for source virtual machine 204 is directed to both source virtual machine 204 and target virtual machine 208 using port mirroring rule 222 while source virtual machine 204 is migrated from source computer 206 to target virtual machine 208 on target computer 210. As depicted, ingress traffic 224 is sent to source virtual machine 204 and target virtual machine 210. Ingress traffic 224 goes to egress rules 207 for target virtual machine 208 in target computer 210, which sends ingress traffic 224 to target virtual machine 210.

This migration involves moving information about source virtual machine 204 to target virtual machine 208 such that target virtual machine 208 becomes source virtual machine 204 with respect to clients or applications using source virtual machine 204. For example, memory, storage, network connectivity, states, and other information can be transferred from source virtual machine 204 to target virtual machine 208.

After the virtual machine live migration is completed, a set of egress rules 226 in a set of computers 228 for the set of virtual machines 218 is switched over from source computer 206 to target computer 210. This switchover can be performed in a number of ways. For example, the switchover can be performed by migration manager 214 updating the set of egress rules 226 in the set of computers 228 for the set of other virtual machines after target virtual machine 208 resumes operation.

In this illustrative example, the port mirroring provided by port mirroring rule 222 provides continuous connectivity until all of the egress traffic is switched over from being sent to source computer 206 to being sent to target computer 210. Once all of the egress traffic is switched over to target virtual machine 208 in target computer 210, port mirroring rule 222 is removed. In the illustrative example, a network connectivity to both source virtual machine 204 and target virtual machine 208 is maintained during the virtual machine live migration from all other virtual machines using port mirroring rule 222.

In one illustrative example, one or more solutions are present that overcome a problem with a virtual machine live migration without an undesired loss in network connectivity in which a port mirroring rule directs ingress traffic received at a source computer for a source virtual machine to both the source virtual machine on the source computer and a target virtual machine on a target computer. As a result, one or more solutions may enable performing virtual machine live migration with reduced or no loss in network connectivity to clients such as other virtual machines, applications, or processes.

Computer system 212 can be configured to perform at least one of the steps, operations, or actions described in the different illustrative examples using software, hardware, firmware, or a combination thereof. As a result, computer system 212 operates as a special purpose computer system in which migration manager 214 in computer system 212 enables performing a virtual machine live migration with a desired level of network connectivity. The manner in which migration manager 214 performs virtual machine live migration can maintain network connectivity for virtual overlay networks. In particular, migration manager 214 transforms computer system 212 into a special purpose computer system as compared to currently available general computer systems that do not have migration manager 214.

In the illustrative example, the use of migration manager 214 in computer system 212 integrates processes into a practical application for virtual machine live migration that increases the performance of computer system 212. In other words, migration manager 214 in computer system 212 is directed to a practical application of processes integrated into migration manager 214 in computer system 212 that creates a port mirroring rule for a source virtual machine in a source computer such that ingress traffic received at the source computer for the source virtual machine is delivered to both the source virtual machine and a target virtual machine on a target computer. The port mirroring rule is established prior to the virtual machine live migration from the source virtual machine to the target virtual machine. The source virtual machine on the source computer is migrated to the target virtual machine on the target computer in which the port mirroring rule directs the ingress traffic for the source virtual machine to both the source virtual machine and the target virtual machine while the source virtual machine is migrated from the source computer to the target virtual machine on the target computer during the virtual machine live migration. In this example, at least the steps and other steps can be implemented in a practical application that increases the performance of computer system 212 by maintaining the network connectivity between the source virtual machine and the target virtual machine with all other virtual machines in communication with the source virtual machine using a port mirroring rule.

The illustration of migration environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, source computer 206, target computer 210, and computers 228 are shown as being part of computer system 212. In some illustrative examples, source computer 206, target computer 210, and computers 228 can be located in another computer system that is remote or separate from computer system 212.

Figure 3:
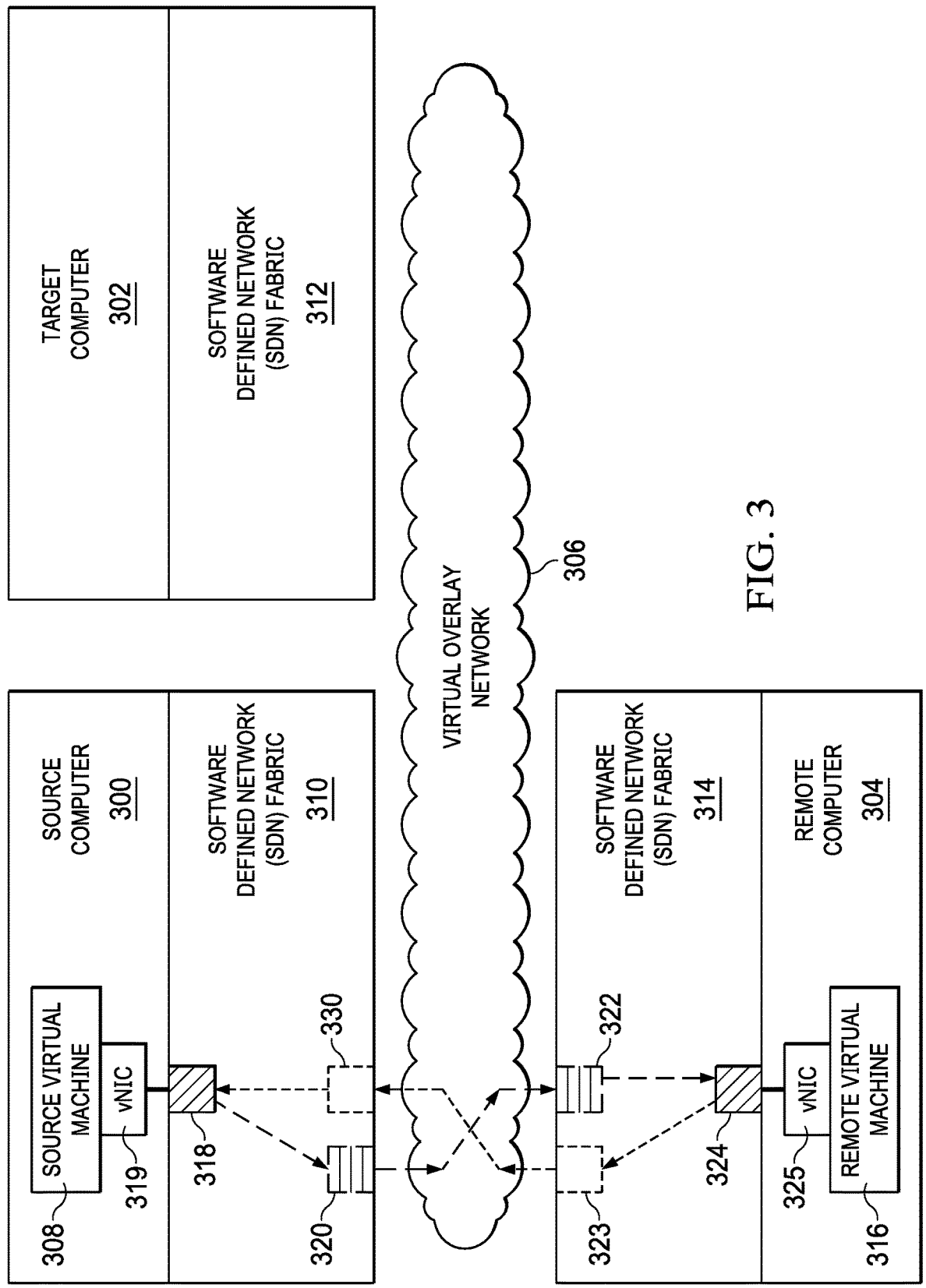
FIG. 3 is a dataflow diagram prior for a virtual machine live migration in accordance with an illustrative embodiment.

Turning now to FIGS. 3-6, data flow diagrams showing data flow for virtual machines before, during, and after a virtual machine live migration are depicted in accordance with an illustrative embodiment. With reference first to FIG. 3, a dataflow diagram prior for a virtual machine live migration is depicted in accordance with an illustrative embodiment. In this illustrative example, source computer 300, target computer 302, and remote computer 304 are hardware components for virtual overlay network 306. Source computer 300 has software defined network (SDN) fabric 310; target computer 302 has software defined network (SDN) fabric 312; and remote computer 304 has software defined network (SDN) fabric 314. These software defined network fabrics provide connections for virtual overlay network 306. Each of these software defined network fabrics include physical ports. A software defined network fabric can be implemented using a network interface card (NIC). In this illustrative example, these software defined network fabrics can be implemented using network interface cards that include processing resources. These processing resources can be supplied by a processor unit. This type of network interface card is also referred to as a smart NIC.

As depicted, source virtual machine (VM) 308 runs on source computer 300. In this particular example, source virtual machine 308 is migrated to target computer 302. Prior to migration, a tunnel rule is present that routes egress traffic from source virtual machine 308 at port 318 in software defined network fabric 310 though port 320 in software defined network fabric 310 to port 322 in software defined network fabric 314.

In this example, software defined network fabric 314 has a tunnel rule that sends the ingress traffic received from source virtual machine 308 to remote virtual machine 316 on remote computer 304 using port 324. In this illustrative example, port 324 has a connection to virtual network interface card (vNIC) 325 for remote virtual machine 316.

In this illustrative example, a tunnel rule is also present in software defined network fabric 314 to encapsulate the egress traffic sent from remote virtual machine 316 to source virtual machine 308. In this example, the tunnel rule routes the egress traffic received from remote virtual machine 316 at port 324 through port 323 to port 330 in software defined network fabric 310.

In turn, this ingress traffic received at port 330 is sent to source virtual machine 308 using port 318 in software defined network fabric 310. In this example, port 318 has a connection to virtual network interface card (vNIC) 319 for source virtual machine 308.

Figure 4:
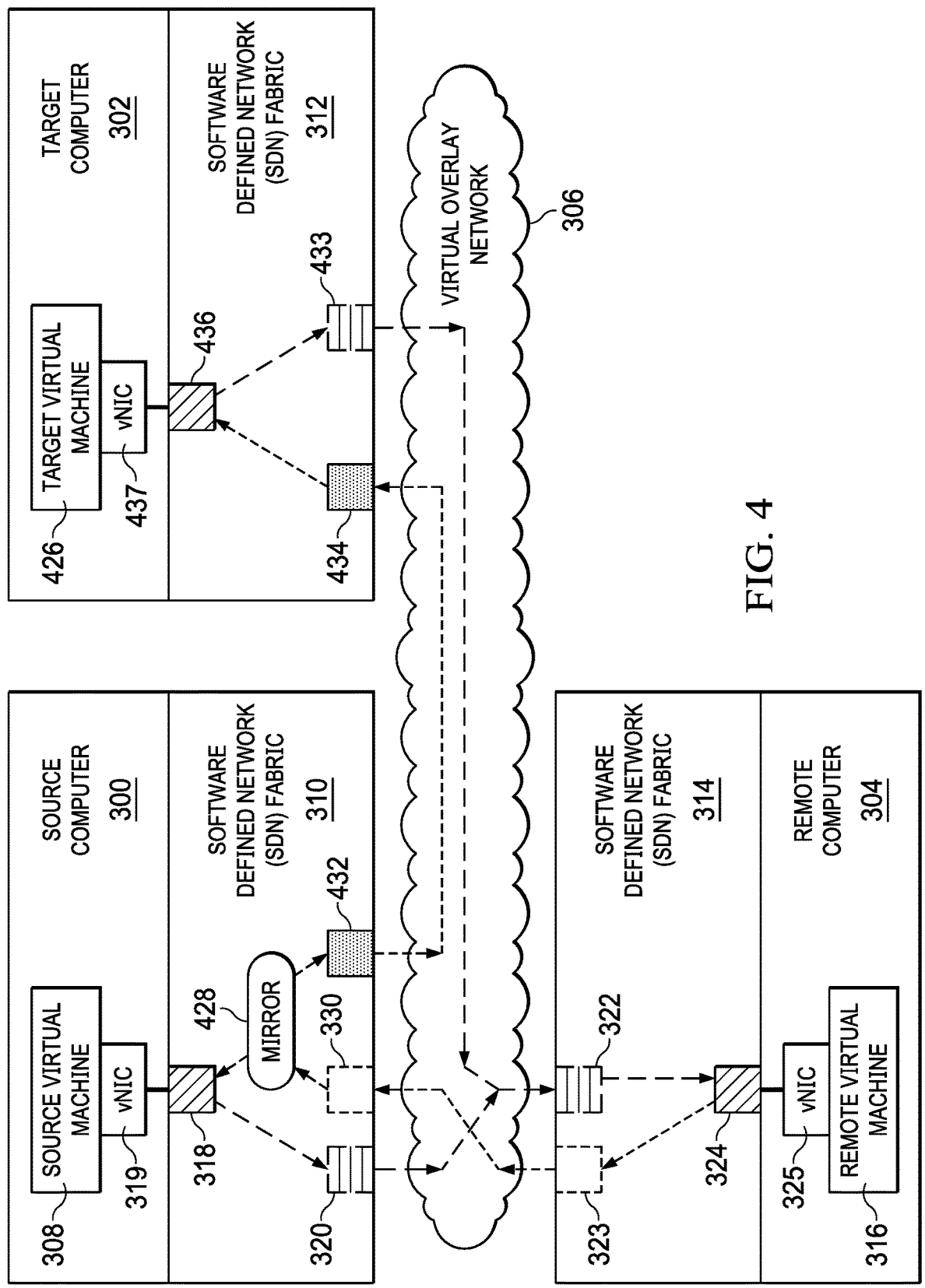
FIG. 4 is a dataflow diagram of a port mirroring connection setup for a virtual machine live migration in accordance with an illustrative embodiment.

With reference to FIG. 4, a dataflow diagram of a port mirroring connection setup for a virtual machine live migration is depicted in accordance with an illustrative embodiment. Data in egress and ingress traffic in this figure is an example of one manner in which port mirroring rule 222 can be established and used by migration manager 214 in FIG. 2 to perform a virtual machine live migration. In the illustrative examples, the same reference numeral may be used in more than one figure. This reuse of a reference numeral in different figures represents the same element in the different figures.

As depicted, a virtual machine live migration is performed to migrate from source virtual machine 308 on source computer 300 to target virtual machine 426 on target computer 302. In this illustrative example, target virtual machine 426 is created and placed into a pause state on target computer 302.

In this illustrative example, port mirroring rule 428 is created in an ingress tunnel rule in software defined network fabric 310. As depicted, port mirroring rule 428 directs the ingress traffic received at port 330 in software defined network fabric 310 from remote virtual machine 316 to source virtual machine 308 through port 318.

Additionally, port mirroring rule 428 also directs the ingress traffic received at port 330 from remote virtual machine 316 to target virtual machine 426. In this illustrative example, this ingress traffic is routed to target virtual machine 426 through port 432 in software defined network fabric 310 to port 434 in software defined network fabric 312. In turn, software defined network fabric 312 has a tunnel rule that directs the ingress traffic for port 434 to port 436. As depicted, port 436 is connected to virtual network interface card (vNIC) 437 for target virtual machine 426.

In other words, port mirroring rule 428 directs the ingress traffic coming from remote virtual machine 316 to both source virtual machine 308 and target virtual machine 426. The ingress traffic can be sent to both of these virtual machines by replicating the ingress traffic and sending the copy to target virtual machine 426.

In this illustrative example, the egress tunnel rule has been set up in software defined network fabric 312 to send egress traffic from target virtual machine 426 to remote virtual machine 316. In this illustrative example, this egress tunnel rule causes the egress traffic for remote virtual machine 316 received at port 436 from target virtual machine 426 to be sent to port 433. In turn, the egress traffic is sent to port 322 in software defined network fabric 314. In this illustrative example, these tunnel rules are set up prior to the migration of source virtual machine 308 to target virtual machine 426.

During migration, the ingress traffic received from remote virtual machine 316 is mirrored and sent to both source virtual machine 308 and target virtual machine 426. The egress traffic from source virtual machine 308 to remote virtual machine 316 is processed or tunneled as usual.

Once the migration of memory and state information from source virtual machine 308 to target virtual machine 426 is complete, target virtual machine 426 on target computer 302 is resumed or begins to run. Additionally, source virtual machine 308 is paused on source computer 300.

With port mirroring rule 428 still active, the ingress traffic from remote virtual machine 316 to source virtual machine 308 continues to be sent to target virtual machine 426. Further, the egress traffic from target virtual machine 426 is sent to remote virtual machine 316 through a tunnel rule pre-established in software defined network fabric 312 prior to the migration. This switchover from source virtual machine 308 to target virtual machine 426 is seamless without an undesired loss in connectivity to remote virtual machine 316.

Figure 5:
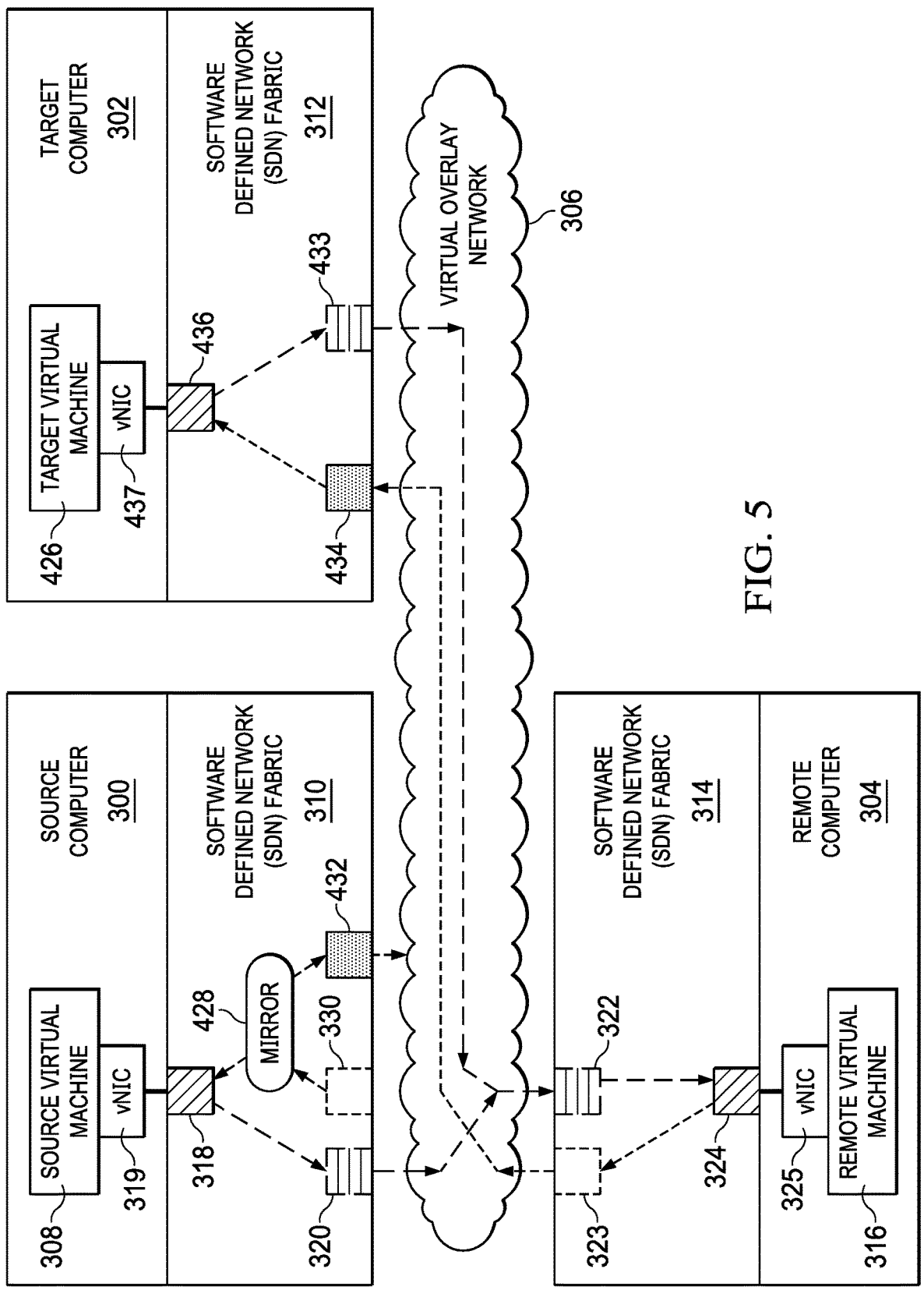
FIG. 5 is a dataflow diagram of a post migration connection switchover from a source virtual machine to a target virtual machine in accordance with an illustrative embodiment.

With reference now to FIG. 5, a dataflow diagram of a post migration connection switchover from a source virtual machine to a target virtual machine is depicted in accordance with an illustrative embodiment.

In this figure, the tunnel rule that sends egress traffic from remote virtual machine 316 to source virtual machine 308 is replaced in software defined network fabric 314 with a new tunnel rule that directs the egress traffic to target virtual machine 426. In this example, the egress traffic received at port 324 is directed to port 323 in software defined network fabric 314. With the new tunnel rule in software defined network fabric 314, the egress traffic from remote virtual machine 316 is now directed to port 434 in software defined network fabric 312, which then has a tunnel rule to route the egress traffic from remote virtual machine 316 to target virtual machine 426.

Figure 6:
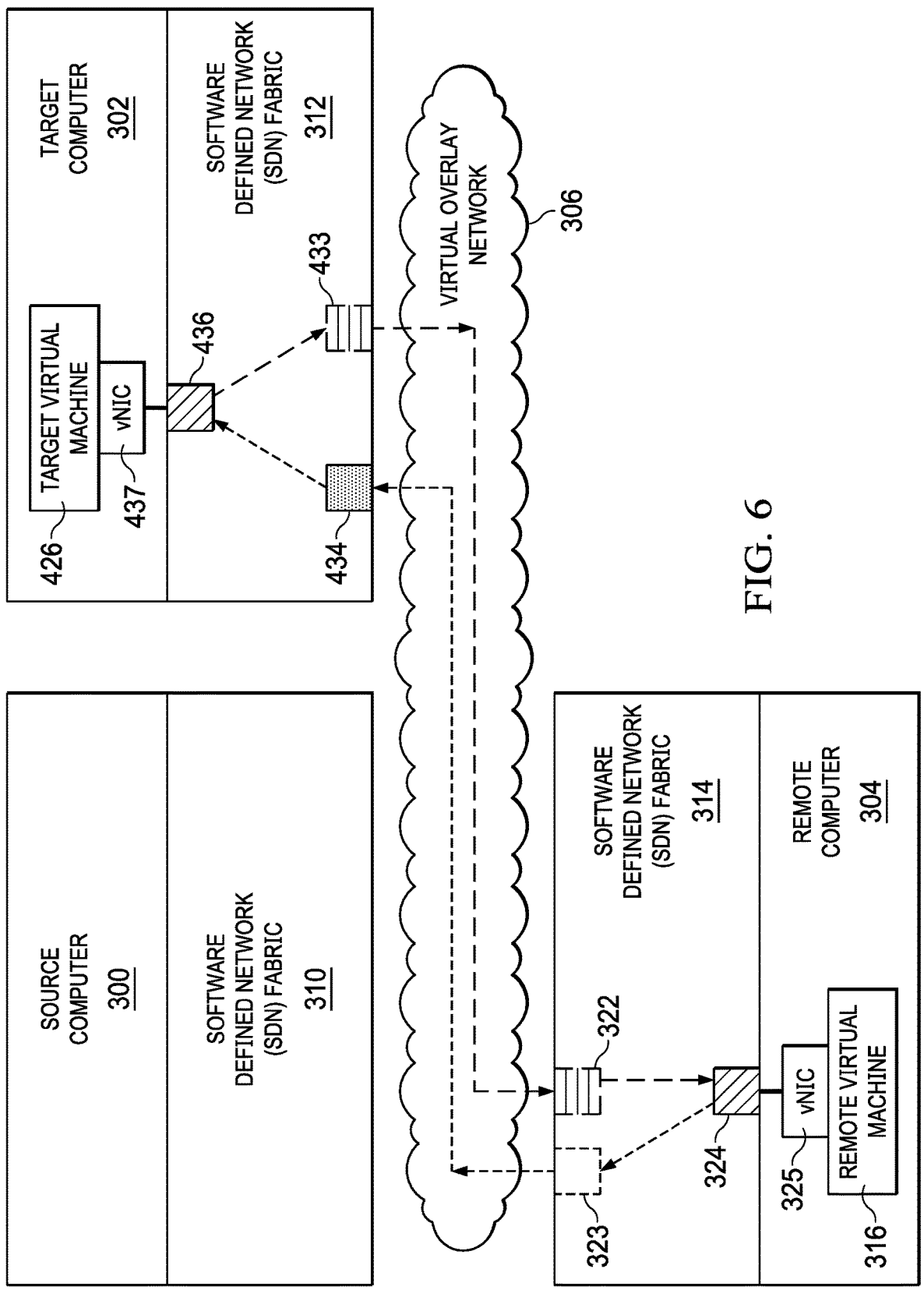
FIG. 6 is a dataflow diagram of a post migration cleanup in accordance with an illustrative embodiment.

Turning now to FIG. 6, a dataflow diagram of a post migration cleanup is depicted in accordance with an illustrative embodiment. When a new tunnel rule is created for remote virtual machine 316, port mirroring rule 428 can be removed and other cleanup can be performed such as removing source virtual machine 308 and tunnel rules for source virtual machine 308 in software defined network fabric 310.

The illustrations of a virtual machine live migration in FIGS. 3-6 are presented to depict one manner in which a virtual machine live migration can be performed and is not meant to limit the manner in which the migration can be setup or performed. For example, in another illustrative example, remote virtual machine 316 may be located in source computer 300 rather than remote computer 304. With this example, a port mirroring rule can mirror traffic received within software defined network fabric 310 from the same computer rather from another computer. As yet another example, remote virtual machine 316 can be located on target computer 302. With this example, a port mirroring rule within software defined network fabric 310 can mirror traffic received from remote virtual machine 316 on target computer 302 with one copy being sent back to target virtual machine 426 on target computer 302.

Figure 7:
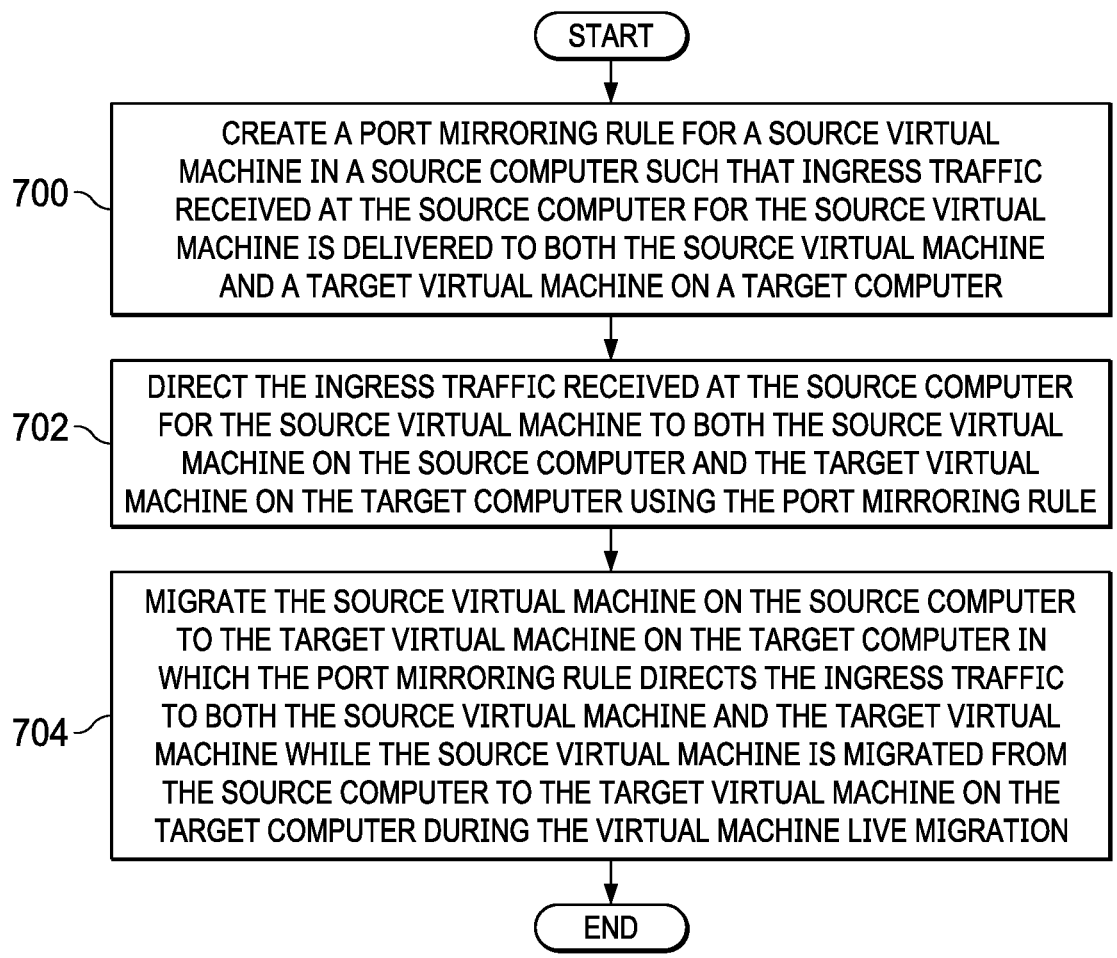
FIG. 7 is a flowchart of a process for a virtual machine live migration in accordance with an illustrative embodiment.

Turning next to FIG. 7, a flowchart of a process for a virtual machine live migration is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in migration manager 214 in computer system 212 in FIG. 2.

The process begins by creating a port mirroring rule for a source virtual machine in a source computer such that ingress traffic received at the source computer for the source virtual machine is delivered to both the source virtual machine and a target virtual machine on a target computer (step 700). In step 700, the port mirroring rule is established prior to the virtual machine live migration from the source virtual machine to the target virtual machine.

The process directs the ingress traffic received at the source computer for the source virtual machine to both the source virtual machine on the source computer and the target virtual machine on the target computer using the port mirroring rule (step 702). The process migrates the source virtual machine on the source computer to the target virtual machine on the target computer in which the port mirroring rule directs the ingress traffic to both the source virtual machine and the target virtual machine while the source virtual machine is migrated from the source computer to the target virtual machine on the target computer during the virtual machine live migration (step 704). The process terminates thereafter.

Figure 8:
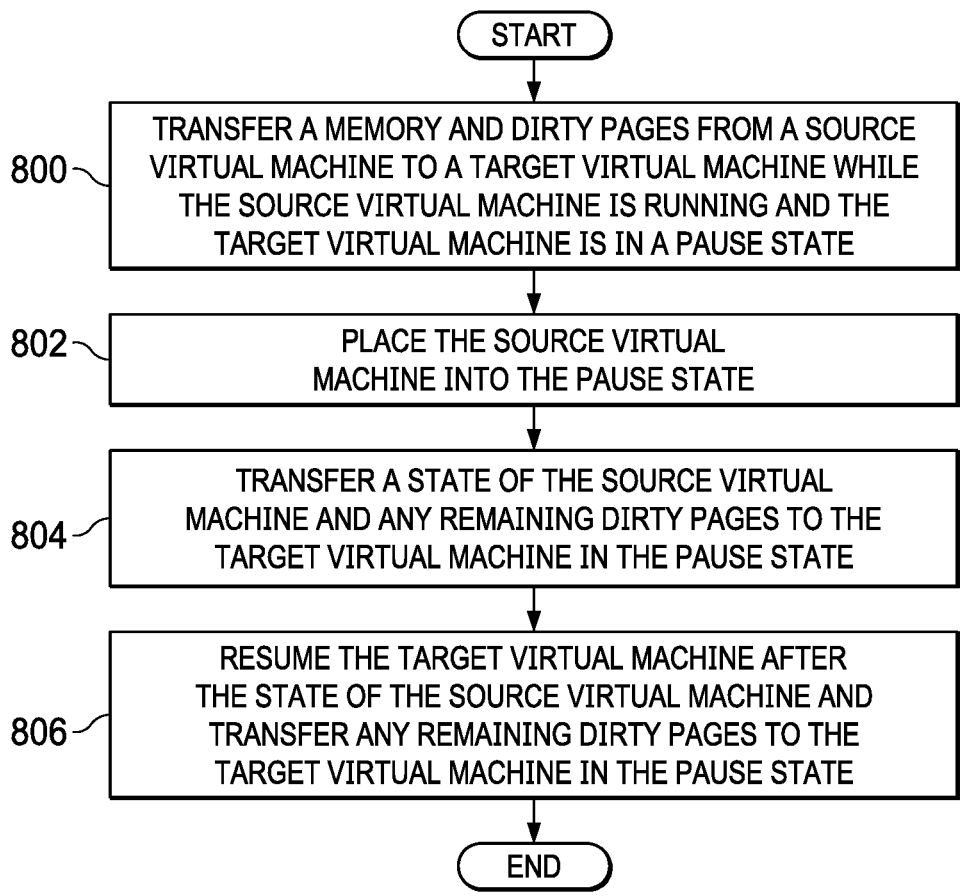
FIG. 8 is a flowchart of a process for migrating a source virtual machine on a source computer to a target virtual machine on a target computer in accordance with an illustrative embodiment.

With reference next to FIG. 8, a flowchart of a process for migrating a source virtual machine on a source computer to a target virtual machine on a target computer is depicted in accordance with an illustrative embodiment. The process in FIG. 8 is an example of one manner in which step 704 in FIG. 7 can be implemented.

The process begins by transferring a memory and dirty pages from a source virtual machine to a target virtual machine while the source virtual machine is running and the target virtual machine is in a pause state (step 800). In step 800, a port mirroring rule directs ingress traffic received at a source computer for the source virtual machine to both the source virtual machine and the target virtual machine while the source virtual machine is running and the target virtual machine is in the pause state.

The process places the source virtual machine into the pause state (step 802). The process transfers a state of the source virtual machine and any remaining dirty pages to the target virtual machine in the pause state (step 806). The process resumes the target virtual machine after the state of the source virtual machine and any remaining dirty pages are transferred to the target virtual machine in the pause state (step 808). The process terminates thereafter.

Figure 9:
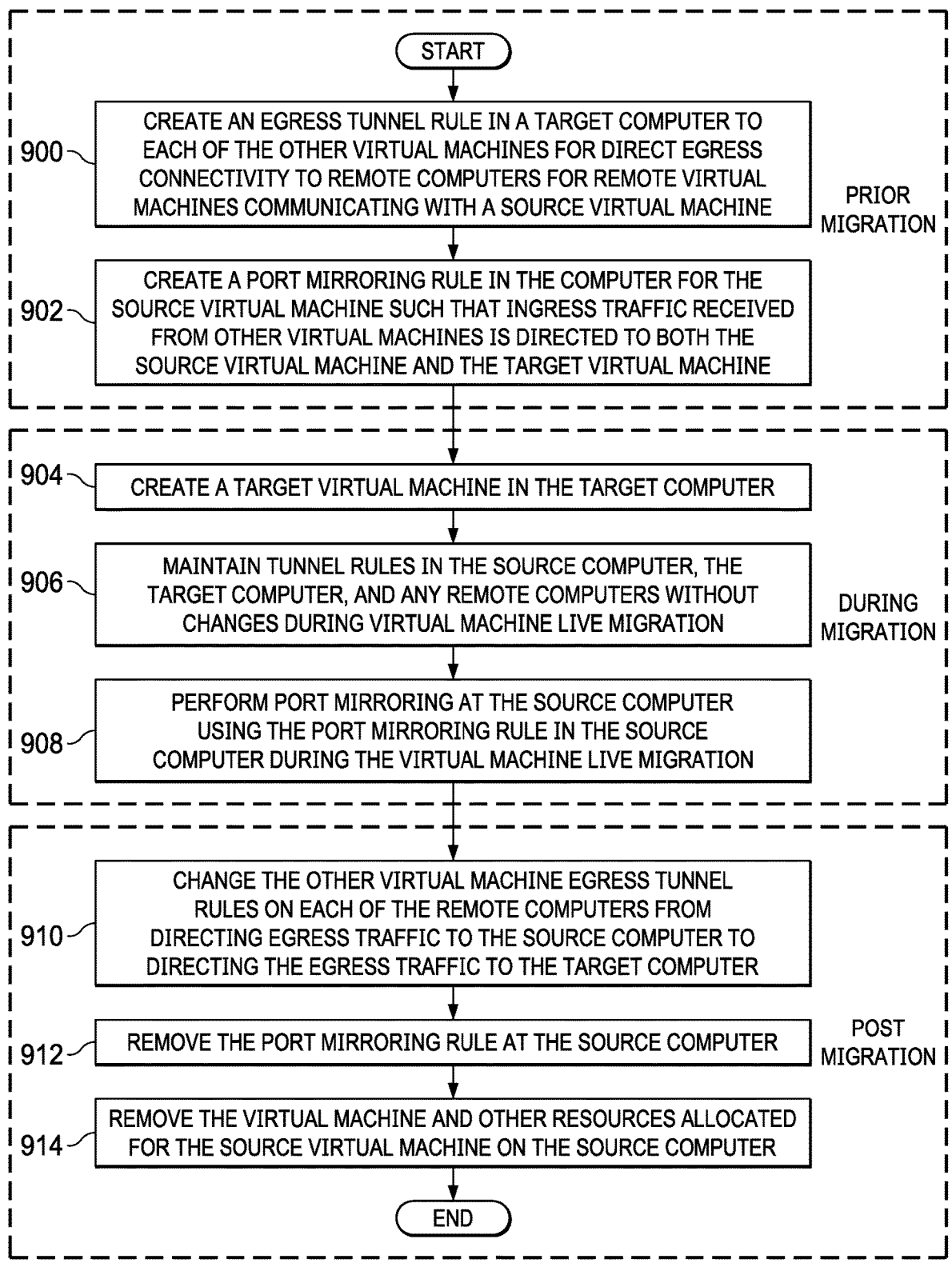
FIG. 9 is an illustration of a flowchart for migrating a source virtual machine to a target virtual machine in accordance with an illustrative embodiment.

With reference now to FIG. 9, an illustration of a flowchart for migrating a source virtual machine to a target virtual machine is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process can be implemented in migration manager 214 in computer system 212 in FIG. 2. The virtual machine live migration process in FIG. 9 can be performed to migrate a source virtual machine in a source computer to a target virtual machine in a target computer in a virtual overlay network.

The process begins by creating an egress tunnel rule in a target computer to each of the other virtual machines for direct egress connectivity to remote computers for remote virtual machines communicating with a source virtual machine (step 900). In step 900, these tunnel rules are set up in a network interface card for the target computer. In this example, the network interface card is a smart NIC. The creation of these egress tunnel rules enables their availability for use in directing egress traffic from a target virtual machine to remote virtual machines, the moment the target virtual machine resumes or begins operation. In this example. these remote virtual machines were communicating with the source virtual machine prior to migration.

The process also creates a port mirroring rule in the computer for the source virtual machine such that ingress traffic received from other virtual machines is directed to both the source virtual machine and a target virtual machine. (step 902). In step 902, data packets in the ingress traffic that show up at the virtual network interface cards are delivered to both the source virtual machine and the target virtual machine during the entire virtual machine live migration.

The process creates a target virtual machine in a target computer (step 904). The target virtual machine is created in a pause state in one illustrative example. As depicted, step 900, step 902, and step 904 are performed prior to migration.

The process maintains tunnel rules in the source computer, the target computer, and any remote computers without changes during virtual machine live migration (step 906). The process performs port mirroring at the source computer using the port mirroring rule in the source computer during the virtual machine live migration (step 908). With the port mirroring rule, configuration changes are not needed with respect to the network during the virtual machine live migration process. Configuration changes are not needed regardless of whether the source virtual machine is in control or in active service or the target virtual machine takes over control or is in active service. Network connectivity is present and available to all remote virtual machines that are connected to or may connect to the source virtual machine during the migration process. As depicted, step 906 and step 908 are performed during migration.

After the virtual machine live migration has completed, the process changes the other virtual machine egress tunnel rules on each of the remote computers from directing egress traffic to the source computer to directing the egress traffic to the target computer (step 910).

The process then removes the port mirroring rule at the source computer (step 912). The process removes the virtual machine and other resources allocated for the virtual machine on the source computer (step 914). The process terminates thereafter. As depicted, step 910, step 912, and step 914 are performed post migration.

With this process, the virtual machine live migration can be performed in a manner that appears to be seamless to clients such as a remote virtual machine, applications, or other processes. The virtual machine live migration process can be performed without a loss or perceived loss in connectivity to the virtual machine that clients or other software processes are connected to using the port mirroring rule as described in the different illustrative examples.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

For example, step 904 can be performed prior to step 902 or prior to step 900. In another example, step 902 can be performed prior to step 900. In other illustrative examples, these three steps can be performed simultaneously.

Figure 10:
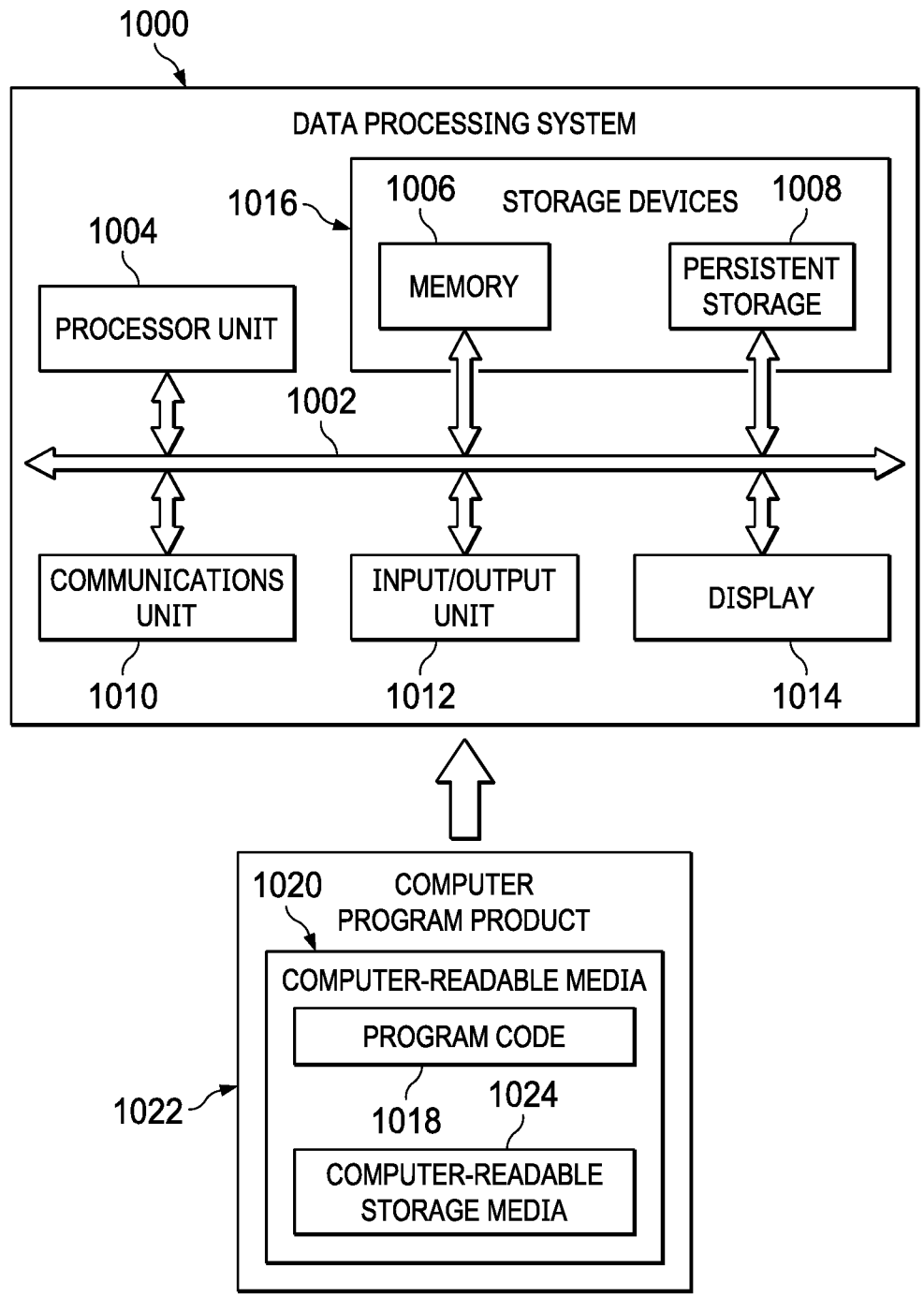
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement server computer 104, server computer 106, client devices 110, in FIG. 1. Data processing system 1000 can also be used to implement computer system 212, source computer 206, target computer 210, and the set of computers 228 in FIG. 2. Source computer 300, target computer 302, and remote computer 304 in FIG. 3 can be implemented using data processing system 1000. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1020" can be singular or plural. For example, program code 1018 can be located in computer-readable media 1020 in the form of a single storage device or system. In another example, program code 1018 can be located in computer-readable media 1020 that is distributed in multiple data processing systems. In other words, some instructions in program code 1018 can be located in one data processing system while other instructions in program code 1018 can be located in one data processing system. For example, a portion of program code 1018 can be located in computer-readable media 1020 in a server computer while another portion of program code 1018 can be located in computer-readable media 1020 located in a set of client computers.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Thus, the illustrative embodiments of the present invention provide a computer implemented method, computer system, and computer program product for performing a virtual machine live migration. A port mirroring rule for a source virtual machine in a source computer is created by a computer system such that ingress traffic received at the source computer for the source virtual machine is delivered to both the source virtual machine and a target virtual machine on a target computer. The port mirroring rule is established prior to the virtual machine live migration from the source virtual machine to the target virtual machine. The source virtual machine on the source computer is migrated by the computer system to the target virtual machine on the target computer in which the port mirroring rule directs the ingress traffic to both the source virtual machine and the target virtual machine while the source virtual machine is migrated from the source computer to the target virtual machine on the target computer during the virtual machine live migration.

With this process, the virtual machine live migration can be formed in a manner that appears to be seamless to clients such as a remote virtual machine, applications, or other processes. The virtual machine live migration process can be performed without a loss or perceived loss in connectivity to the virtual machine that clients or other software processes are connected. The connectivity can be maintained using the port mirroring rule as described in the different illustrative examples.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for a virtual machine live migration, the method comprising:
    creating, by a computer system, a target virtual machine on a target computer, the target virtual machine comprising a migration destination for a source virtual machine executing on a source computer, wherein the source virtual machine communicates with a plurality of other virtual machines running on a plurality of remote computers, and wherein each of the source computer and the plurality of other virtual machines each have an associated set of egress rules stored on a respective network interface controller associated with each of the source computer and the plurality of remote computers;
    subsequent to creating the target virtual machine, creating, by the computer system, a port mirroring rule for the source virtual machine in a network interface controller of the source computer, wherein the port mirroring rule copies and directs data packets from ingress traffic received at the source computer for the source virtual machine to both the source virtual machine and the target virtual machine on the target computer, and wherein the port mirroring rule comprises at least one of a layer-2 rule that redirects mirrored traffic to a media access controller address for a virtual network interface controller for the target virtual machine or a layer-3 rule that redirects the mirrored traffic to an Internet Protocol address for the virtual network interface controller for the target virtual machine;
    creating, by the computer system, an egress tunnel rule for the target virtual machine in a network interface controller of the target computer, the egress tunnel rule establishing direct egress connectivity between the target virtual machine and each of the plurality of other virtual machines that communicate with the source virtual machine wherein the egress tunnel rule and the port mirroring rule are established prior to the virtual machine live migration from the source virtual machine to the target virtual machine;
    directing, by the computer system, the ingress traffic received at the source computer for the source virtual machine to both the source virtual machine and the target virtual machine using the port mirroring rule;
    migrating, by the computer system, the source virtual machine on the source computer to the target virtual machine on the target computer in which the port mirroring rule directs the ingress traffic to both the source virtual machine and the target virtual machine while the source virtual machine is migrated from the source computer to the target virtual machine on the target computer during the virtual machine live migration; and
    removing, by the computer system, the port mirroring rule at the source computer and updating egress tunnel rules on each of the plurality of other virtual machines from directing egress traffic to the source computer to directing the egress traffic to the target computer after the migrating is completed.

2. The method of claim 1 further comprising: directing, by the computer system, the ingress traffic received at the source computer for the source virtual machine to both the source virtual machine on the source computer and the target virtual machine on the target computer using the port mirroring rule.

3. The method of claim 1 further comprising: creating, by the computer system, a set of egress rules to a set of virtual machines communicating with the source virtual machine prior to the virtual machine live migration.

4. The method of claim 1, wherein a network connectivity to both to the source virtual machine and the target virtual machine is maintained during the virtual machine live migration with all other virtual machines using the port mirroring rule.

5. The method of claim 1, wherein migrating, by the computer system, the source virtual machine on the source computer to the target virtual machine on the target computer comprises:
- transferring, by the computer system, a memory and dirty pages from the source virtual machine to the target virtual machine while the source virtual machine is running and the target virtual machine is in a pause state, wherein the port mirroring rule directs the ingress traffic received at the source computer for the source virtual machine to both the source virtual machine and the target virtual machine while the source virtual machine is running and the target virtual machine in the pause state;
- placing, by the computer system, the source virtual machine into the pause state;
- transferring, by the computer system, a state of the source virtual machine and any remaining dirty pages to the target virtual machine in the pause state; and
- resuming, by the computer system, the target virtual machine after the state of the source virtual machine and any remaining dirty pages are transferred to the target virtual machine in the pause state.

6. The method of claim 1 further comprising: notifying, by the computer system, other virtual machines that the target virtual machine is present when the target virtual machine resumes operation.

7. The method of claim 1 further comprising:
- modifying an egress rule for another virtual machine from sending traffic to the source virtual machine on the source computer to the target virtual machine on the target computer;
- removing the port mirroring rule; and
- removing the source virtual machine after removing the port mirroring rule.

8. The method of claim 1, wherein the port mirroring rule is implemented by a processing unit in a network adapter in the computer system.

9. A virtual machine migration system comprising:
- a bus system comprising a processor; and
- a memory coupled to the bus system, wherein the memory stores program instructions executed by the processor and configured to:
- create a target virtual machine on a target computer, the target virtual machine comprising a migration destination for a source virtual machine executing on a source computer, wherein the source virtual machine communicates with a plurality of other virtual machines running on a plurality of remote computers, and wherein each of the source computer and the plurality of other virtual machines each have an associated set of egress rules stored on a respective network interface controller associated with each of the source computer and the plurality of remote computers;
- subsequent to creating the target virtual machine, create a port mirroring rule for the source virtual machine in the source computer, wherein the port mirroring rule copies and directs data packets from ingress traffic received at the source computer for the source virtual machine to both the source virtual machine and the target virtual machine on the target computer, and wherein the port mirroring rule comprises at least one of a layer-2 rule that redirects mirrored traffic to a media access controller address for a virtual network interface controller for the target virtual machine or a layer-3 rule that redirects the mirrored traffic to an Internet Protocol address for the virtual network interface controller for the target virtual machine;
- create an egress tunnel rule for the target virtual machine in a network interface controller of the target computer, the egress tunnel rule establishing direct egress connectivity between the target virtual machine and each of the plurality of other virtual machines that communicate with the source virtual machine, wherein the egress tunnel rule and the port mirroring rule are established prior to a virtual machine live migration from the source virtual machine to the target virtual machine and
- direct the ingress traffic received at the source computer for the source virtual machine to both the source virtual machine and the target virtual machine using the port mirroring rule;
- migrates the source virtual machine on the source computer to the target virtual machine on the target computer in which the port mirroring rule directs the ingress traffic to both the source virtual machine and the target virtual machine while the source virtual machine is migrated from the source computer to the target virtual machine on the target computer during the virtual machine live migration, and
- remove, by the computer system, the port mirroring rule at the source computer and updating egress tunnel rules on each of the plurality of other virtual machines from directing egress traffic to the source computer to directing the egress traffic to the target computer after the migrating is completed.

10. The virtual machine migration system of claim 9, wherein the computer system directs the ingress traffic received at the source computer for the source virtual machine to both the source virtual machine on the source computer and the target virtual machine on the target computer using the port mirroring rule.

11. The virtual machine migration system of claim 9, wherein the computer system creates a set of egress rules to a set of virtual machines communicating with the source virtual machine prior to the virtual machine live migration from the source virtual machine to the target virtual machine.

12. The virtual machine migration system of claim 9, wherein a network connectivity to both to the source virtual machine and the target virtual machine is maintained during the virtual machine live migration with all other virtual machines using the port mirroring rule.

13. The virtual machine migration system of claim 9, wherein in migrating, by the computer system, the source virtual machine on the source computer to the target virtual machine on the target computer, the computer system transfers a memory and dirty pages from the source virtual machine to the target virtual machine while the source virtual machine is running and the target virtual machine is in a pause state, wherein the port mirroring rule directs the ingress traffic received at the source computer for the source virtual machine to both the source virtual machine and the target virtual machine while the source virtual machine is running and the target virtual machine in the pause state;

places the source virtual machine into the pause state; transfers, by the computer system, a state of the source virtual machine and any remaining dirty pages to the target virtual machine in the pause state; and resumes the target virtual machine after the state of the source virtual machine and any remaining dirty pages are transferred to the target virtual machine in the pause state.

14. The virtual machine migration system of claim 9, wherein the computer system notifies other virtual machines that the target virtual machine is present when the target virtual machine resumes operation.

15. The virtual machine migration system of claim 9, wherein the computer system modifies an egress rule for another virtual machine from sending traffic to the source virtual machine on the source computer to the virtual machine one the target computer; removes the port mirroring rule; and removes the source virtual machine after removing the port mirroring rule.

16. A computer program product for a virtual machine live migration, the computer program product comprising:
   a computer-readable storage media;
   first program code, stored on the computer-readable storage media, executable by a computer system to cause the computer system to:
      create a target virtual machine on a target computer, the target virtual machine comprising a migration destination for a source virtual machine executing on a source computer, wherein the source virtual machine communicates with a plurality of other virtual machines running on a plurality of remote computers, and wherein each of the source computer and the plurality of other virtual machines each have an associated set of egress rules stored on a respective network interface controller associated with each of the source computer and the plurality of remote computers, and
      subsequent to creating the target virtual machine, create a port mirroring rule for a source virtual machine in a network interface controller of the source computer, wherein the port mirroring rule copies and directs ingress traffic received at the source computer for the source virtual machine is delivered to both the source virtual machine and the target virtual machine on the target computer, and wherein the port mirroring rule comprises at least one of a layer-2 rule that redirects mirrored traffic to a media access controller address for a virtual network interface controller for the target virtual machine or a layer-3 rule that redirects the mirrored traffic to an Internet Protocol address for the virtual network interface controller for the target virtual machine, and wherein the port mirroring rule is established prior to the virtual machine live migration;
   second program code, stored on the computer-readable storage media, executable by a computer system to create an egress tunnel rule for the target virtual machine in a network interface controller of the target computer, the egress tunnel rule establishing direct egress connectivity between the target virtual machine and each of the plurality of other virtual machines that communicate with the source virtual machine, wherein the egress tunnel rule is established prior to the virtual machine live migration from the source virtual machine to the target virtual machine;
   third program code, stored on the computer-readable storage media, executable by a computer system to cause the computer system to direct the ingress traffic received a at the source computer for the source virtual machine to both the source virtual machine and the target virtual machine using the port mirroring rule;
   fourth program code, stored on the computer-readable storage media, executable by a computer system to cause the computer system to migrate the source virtual machine on the source computer to the target virtual machine on the target computer in which the port mirroring rule directs the ingress traffic to both the source virtual machine and the target virtual machine while the source virtual machine is migrated from the source computer to the target virtual machine on the target computer during the virtual machine live migration; and
   fifth program code, stored on the computer-readable storage media, executable by a computer system to cause the computer system to remove the port mirroring rule at the source computer and updating egress tunnel rules on each of the plurality of other virtual machines from directing egress traffic to the source computer to directing the egress traffic to the target computer after the migrating is completed.

17. The computer program product of claim 16 further comprising:
   sixth program code, stored on the computer-readable storage media, executable by a computer system to cause the computer system to direct the ingress traffic received at the source computer for the source virtual machine to both the source virtual machine on the source computer and the target virtual machine on the target computer using the port mirroring rule.

18. The computer program product of claim 16 further comprising:
   seventh program code, stored on the computer-readable storage media, executable by a computer system to cause the computer system to create a set of egress rules to a set of virtual machines communicating with the source virtual machine prior to the virtual machine live migration.

* * * * *